United States Patent
Chun et al.

(10) Patent No.: US 9,167,584 B2
(45) Date of Patent: Oct. 20, 2015

(54) METHOD AND APPARATUS FOR ALLOCATING RESOURCES IN A MULTI-NODE SYSTEM

(75) Inventors: Jin Young Chun, Anyang-si (KR); Ki Tae Kim, Anyang-si (KR); Su Nam Kim, Anyang-si (KR); Ji Won Kang, Anyang-si (KR); Bin Chul Ihm, Anyang-si (KR); Sung Ho Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 82 days.

(21) Appl. No.: 13/991,393

(22) PCT Filed: Dec. 2, 2011

(86) PCT No.: PCT/KR2011/009308
§ 371 (c)(1),
(2), (4) Date: Jun. 3, 2013

(87) PCT Pub. No.: WO2012/074326
PCT Pub. Date: Jun. 7, 2012

(65) Prior Publication Data
US 2013/0258987 A1    Oct. 3, 2013

Related U.S. Application Data

(60) Provisional application No. 61/419,205, filed on Dec. 2, 2010.

(51) Int. Cl.
*H04W 72/00* (2009.01)
*H04W 72/04* (2009.01)
*H04L 5/00* (2006.01)
(Continued)

(52) U.S. Cl.
CPC ......... *H04W 72/0453* (2013.01); *H04L 5/0032* (2013.01); *H04L 5/0073* (2013.01); *H04W 72/04* (2013.01); *H04L 5/001* (2013.01); *H04L 5/0023* (2013.01); *H04L 5/0037* (2013.01); *H04L 5/0092* (2013.01); *H04W 16/10* (2013.01); *H04W 16/12* (2013.01); *H04W 72/00* (2013.01)

(58) Field of Classification Search
CPC ....... H04L 5/00; H04L 5/0007; H04L 5/0037; H04L 5/0053; H04W 72/00; H04W 72/04
USPC ........................ 370/329; 455/422.1, 444, 509
See application file for complete search history.

(56) References Cited

U.S. PATENT DOCUMENTS

2009/0052387 A1*   2/2009   Lee et al. ...................... 370/329
2010/0034151 A1    2/2010   Alexiou et al.
(Continued)

FOREIGN PATENT DOCUMENTS

KR   10-2005-0084310 A   8/2005
KR   10-2009-0032628 A   4/2009

*Primary Examiner* — Sulaiman Nooristany
(74) *Attorney, Agent, or Firm* — Dentons US LLP

(57) ABSTRACT

Provided are a method and apparatus for allocating resources in a multi-node system that includes a plurality of nodes and a base station connected to each of the nodes to control the nodes. The method comprises: partitioning radio resources into a node-common region and a node-specific region, and allocating the node-common region and the node-specific region to the plurality of nodes, wherein a common resource allocation scheme is applied to the plurality of nodes in the node-common region, and different resource allocation schemes are applied to the plurality of nodes in the node-specific region.

8 Claims, 14 Drawing Sheets

(51) Int. Cl.
    *H04W 16/10*    (2009.01)
    *H04W 16/12*    (2009.01)

(56)    References Cited

U.S. PATENT DOCUMENTS

| | | | |
|---|---|---|---|
| 2010/0214993 A1* | 8/2010 | Malkov et al. | 370/329 |
| 2010/0309876 A1* | 12/2010 | Khandekar et al. | 370/330 |
| 2011/0244870 A1* | 10/2011 | Lee | 455/444 |
| 2011/0268070 A1* | 11/2011 | Guan et al. | 370/329 |
| 2012/0004006 A1* | 1/2012 | Lu et al. | 455/522 |
| 2012/0127878 A1* | 5/2012 | Kim et al. | 370/252 |
| 2012/0320831 A1* | 12/2012 | Lee et al. | 370/328 |
| 2013/0021989 A1* | 1/2013 | Tiirola et al. | 370/329 |
| 2013/0203454 A1* | 8/2013 | Almgren et al. | 455/509 |
| 2014/0211724 A1* | 7/2014 | Cai et al. | 370/329 |

* cited by examiner

FIG. 12

| FP #0 : CFP | PERMUTATION 1 |
|---|---|
| FP #1 : SFP | PERMUTATION 2 |
| FP #2 : SFP | PERMUTATION 3 |
| FP #3 : SFP | PERMUTATION 4 | node #n

| FP #0 : CFP | PERMUTATION 1 |
|---|---|
| FP #1 : SFP | PERMUTATION 3 |
| FP #2 : SFP | PERMUTATION 4 |
| FP #3 : SFP | PERMUTATION 2 | node #m

FREQUENCY

TIME

: E-PDCCH

METHOD AND APPARATUS FOR ALLOCATING RESOURCES IN A MULTI-NODE SYSTEM

This Application is a 35 U.S.C. §371 National Stage Entry of International Application No. PCT/KR2011/009308, filed Dec. 2, 2011 and claims the benefit of U.S. Provisional Application No. 61/419,205, filed Dec. 2, 2010, all of which are incorporated by reference in their entirety herein.

TECHNICAL FIELD

The present invention relates to wireless communication and, more particularly, to a method and apparatus for allocating radio sources in a multi-node system.

BACKGROUND ART

Recently, the data transfer rate over a wireless communication network is rapidly increasing. This results from the appearance and spread of a variety of devices, such as smart phones and tablet PCs which require Machine-to-Machine (M2M) communication and a high data transfer rate. Carrier Aggregation (CA) technology in which more frequency bands are efficiently used in order to meet a higher data transfer rate, Cognitive Radio (CR) technology, multiple antenna technology in which a data capacity is increased within a limited frequency, multiple base station cooperation technology, etc. are recently highlighted.

Furthermore, a wireless communication network is evolving toward a tendency that the density of accessible nodes around a user is increasing. Here, the nodes mean antennas or a group of antennas which are spaced apart from one another at specific intervals. However, the node is not limited to this sense, but can be used as a broader sense. That is, the node can become a pico eNB (PeNB), a home eNB (HeNB), a Remote Radio Head (RRH), a Remote Radio Unit (RRU), a relay, or distributed antennas (or group). A wireless communication system including nodes having a high density can have higher system performance through cooperation between the nodes. That is, if the transmission and reception of nodes are managed by one control station and thus the nodes operates like antennas or a group of antennas for one cell, the nodes can have more excellent system performance as compared with a case where the nodes operate as independent base stations. A wireless communication system including a plurality of nodes is hereinafter referred to as a multi-node system. If each node forming a multi-node system is an antenna, it is called a Distributed Antenna System (DAS).

In a multi-node system, if each node has its own identifier (ID) and performs scheduling and handover, this multi-node system can be considered as a multi-cell system. In a multi-cell system, if the coverages of cells (i.e., nodes) are overlaid with each other, this multi-cell system is called a multi-tier network.

In an existing wireless communication system, antennas are locally deployed in an eNB that provides service to a specific geographical area. This wireless communication system is referred to as a localized antenna system. If a multi-node system is introduced, it is preferred that a terminal operating in an existing localized antenna system be not influenced. Furthermore, it is preferred that interference between nodes be minimized.

There is a need for a method and apparatus for allocating resources in which the above points have been taken into consideration in a multi-node system.

DISCLOSURE

Technical Problem

Provided are a method and apparatus for allocating resources in a multi-node system.

Technical Solution

In accordance with an aspect of the present invention, a method of allocating resources in a multi-node system comprising a plurality of nodes and a base station connected to the plurality of nodes and capable of controlling the plurality of nodes includes partitioning radio resources into a node-common region and a node-specific region and allocating the node-common region and the node-specific region to the plurality of nodes, wherein a common resource allocation scheme is applied to the plurality of nodes in the node-common region, and different resource allocation schemes are applied to the plurality of nodes in the node-specific region.

A node-common signal common to the plurality of nodes may be transmitted in the node-common region, and a node-specific signal specific to each of the plurality of nodes may be transmitted in the node-specific region.

The radio resources may include a plurality of frequency partitions in a frequency domain, and some frequency partitions of the plurality of frequency partitions may be allocated to the node-common region and the remaining frequency partitions may be allocated to the node-specific region.

The number of the plurality of frequency partitions may be 4.

A ratio of frequency partitions allocated to the node-common region to frequency partitions allocated to the node-specific region, from among the plurality of frequency partitions, may be the same in all the plurality of nodes.

The same resource unit permutation may be applied to the plurality of nodes in the frequency partitions allocated to the node-common region.

Different resource unit permutations may be applied to the plurality of nodes in the frequency partitions allocated to the node-specific region.

The radio resources may be divided into a control region to which a control channel is allocated and a data region to which a data channel is allocated in a time domain, the node-common region may be included in the control region, and the node-specific region may be included in the data region.

The node-specific region may be predetermined within the data region.

The node-specific region may be indicated through a higher layer signal.

In accordance with another aspect of the present invention, an apparatus for allocating resources in a multi-node system connected to a plurality of nodes and capable of controlling the plurality of nodes includes a Radio Frequency (RF) unit transmitting and receiving radio signals and a processor coupled with the RF unit and generating the radio signal, wherein the processor partitions radio resources into a node-common region and a node-specific region, allocates the node-common region and the node-specific region to the plurality of nodes, applies a common resource allocation scheme to the plurality of nodes in the node-common region, and applies different resource allocation schemes to the plurality of nodes in the node-specific region.

Advantageous Effects

In a multi-node system, a terminal operating in an existing localized antenna system can be provided with service without being influenced. Furthermore, interference between nodes forming a multi-node system can be minimized.

BRIEF DESCRIPTION OF THE DRAWINGS

FIG. 12 shows an example in which permutation is applied to each FP in two nodes.

MODE FOR INVENTION

The following technology can be used in a variety of multiple access schemes, such as Code Division Multiple Access (CDMA), Frequency Division Multiple Access (FDMA), Time Division Multiple Access (TDMA), Orthogonal Frequency Division Multiple Access (OFDMA), and Single Carrier-Frequency Division Multiple Access (SC-FDMA). CDMA can be implemented using radio technology, such as Universal Terrestrial Radio Access (UTRA) or CDMA2000. TDMA can be implemented by radio technology, such as Global System for Mobile communications (GSM)/General Packet Radio Service (GPRS)/Enhanced Data Rates for GSM Evolution (EDGE). OFDMA can be implemented by radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3$^{rd}$ Generation Partnership Project (3GPP) Long Term Evolution (LTE) is part of an Evolved UMTS (E-UMTS) using E-UTRA, and it adopts OFDMA in downlink and adopts SC-FDMA in uplink. LTE-Advanced (A) is a subsequent system of LTE. IEEE 802.16m is a subsequent system of IEEE 802.16e.

Figure 1:
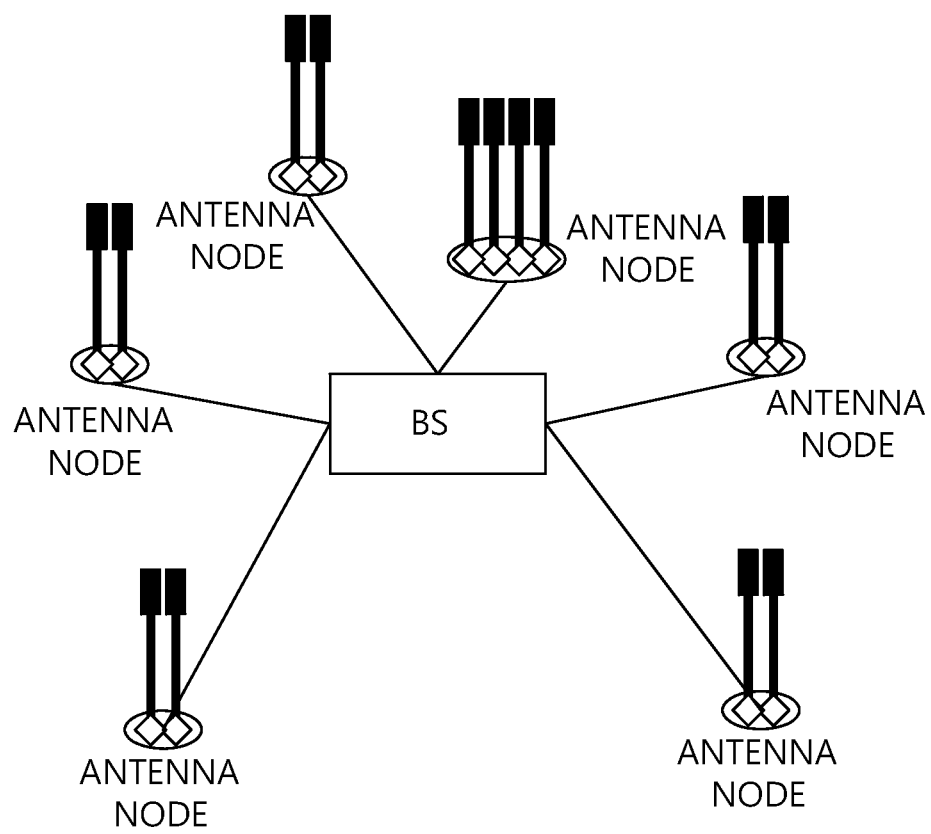
FIG. 1 shows an example of a multi-node system.

FIG. 1 shows an example of a multi-node system.
The multi-node system includes a Base Station (BS) and a plurality of nodes.
The BS provides communication service to a specific geographical area. The BS commonly refers to a fixed station that communicates with terminals, and the BS may also be called another term, such as an evolved-NodeB (eNB), a Base Transceiver System (BTS), or an Advanced Base Station (ABS).
FIG. 1 shows distributed antennas as an example of nodes. In this sense, the node is indicated by an Antenna Node (AN). However, the node is not limited to a distributed antenna, but can be implemented using a macro BS, a picocell eNB (PeNB), a home eNB (HeNB), a Remote Radio Head (RRH), or a relay, for example. The node is also called a point.

From a viewpoint of a terminal, a node can be identified or indicated through a Reference Signal (RS) or a pilot signal. The RS (or pilot signal) is a signal known to a transmission terminal and a reception terminal, and it means a signal used in channel measurement, data demodulation, etc. An RS can include, for example, a Channel Status Information-Reference Signal (CSI-RS) regulated in 3GPP LTE-A. In LTE/LTE-A systems, one CSI-RS configuration can be mapped to one node. A terminal can identify a node or receive an instruction of a node based on this CSI-RS configuration, and the terminal can obtain channel status information about a corresponding node. A CSI-RS configuration can include information about the number of antenna ports, Resource Elements (REs) used, a transmission cycle, an offset for a transmission point, etc.

Referring to back to FIG. 1, the antenna nodes are connected to the BS in a wired/wireless manner. Each of the antenna nodes can include one antenna or an antenna group (i.e., a plurality of antennas). Antennas belonging to one antenna node are placed within several meters geographically, and they can have the same characteristic. In a multi-antenna node system, an antenna node functions as an Access Point (AP) that is accessible to terminal.

If a node includes antennas as described above, this multi-node system is also called a Distributed Antenna System (DAS). That is, a DAS refers to a system in which antennas (i.e., nodes) are distributed and deployed at various positions geographically and the antennas are managed by an eNB. A DAS differs from a conventional Centralized Antenna System (CAS) in that the antennas of an eNB are localized and placed at the center of a cell.

The meaning that antennas are distributed and deployed geographically can mean that one receiver and a plurality of antennas are deployed so that a difference in the channel status between each of the antennas and the receiver is a specific value or higher when the one receiver receives the same signal from the plurality of antennas. The meaning that antennas are localized and deployed can mean that the antennas are densely deployed so that a difference in the channel status between each of the antennas and one receiver is less than a specific value. The specific value can be determined in various ways depending on a frequency and the type of service used in antennas.

If a multi-node system is introduced, it is preferred that a terminal operating in an existing localized antenna system be not influenced. Furthermore, it is preferred that interference between nodes be minimized. There is a need for a method and apparatus for allocating resources into which the above points have been taken into consideration in a multi-node system.

First, a conventional method of allocating resources is described.

Figure 2:
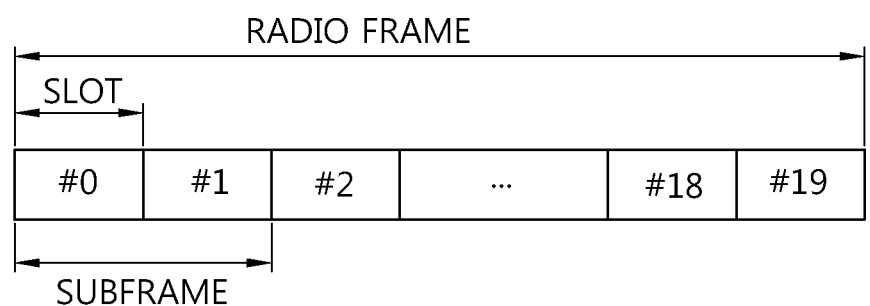
FIG. 2 shows the structure of a radio frame in 3GPP LTE.

FIG. 2 shows the structure of a radio frame in 3GPP LTE.
Referring to FIG. 2, the radio frame includes 10 subframes, and each of the subframes includes 2 slots. The slots within the radio frame are given slot numbers from #0 to #19. The time that is taken for one subframe to be transmitted is called a Transmission Time Interval (TTI). The TTI can be called a scheduling unit for data transmission. For example, the length of one radio frame can be 10 ms, the length of one subframe can be 1 ms, and the length of one slot can be 0.5 ms. If a slot is used in downlink, the slot is called a downlink slot, and if a slot is used in uplink, the slot is called an uplink slot. Here, downlink means a communication link from an eNB or a node to a terminal, and uplink means a communication link from a terminal to an eNB or a node.

Figure 3:
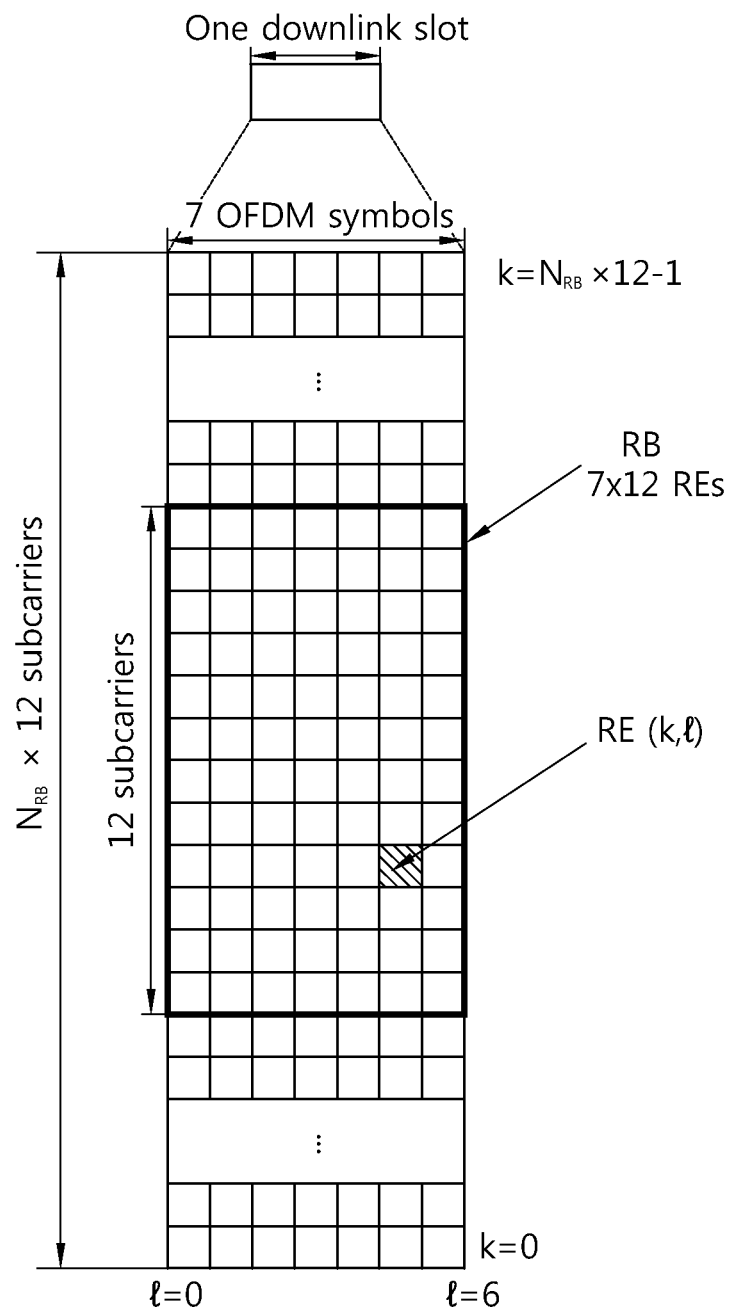
FIG. 3 shows an example of a resource grid for one downlink slot in 3GPP LTE.

FIG. 3 shows an example of a resource grid for one downlink slot in 3GPP LTE.

The downlink slot includes a plurality of OFDM symbols in a time domain and includes $N_{RB}$ Resource Blocks (RBs) in a frequency domain. An RB is a resource allocation unit, and the RB includes one slot in a time domain and a plurality of contiguous subcarriers in a frequency domain. The RB includes a Physical Resource Block (PRB) and a Virtual Resource Block (VRB).

A PRB includes 7 contiguous OFDM symbols and 12 contiguous subcarriers in a normal CP (when a subcarrier interval is 15 KHz) and includes 6 contiguous OFDM symbols and 12 contiguous subcarrier in an extended CP (when a subcarrier interval is 15 KHz). If a subcarrier interval is 7.5 KHz, a PRB includes 3 contiguous OFDM symbols and 24 contiguous subcarriers.

A VRB has the same size as a PRB. A VRB is defined by a localized type and a distributed type. A localized type VRB corresponds to a PRB without change. A distributed type VRB has a gap value dependent on a system band and it is mapped to a PRB.

The number $N_{RB}$ of RBs included in a downlink slot depends on a downlink transmission bandwidth configured in a cell. For example, in an LTE system, the number $N_{RB}$ can be any one of 6 to 110.

An element on a resource grid is called a Resource Element (RE). An RE on a resource grid can be identified by an index pair (k,l) within a slot. Here, $k(k=0, \ldots, N_{RB} \times 12-1)$ is a subcarrier index within a frequency domain, and $l(l=0, \ldots, 6)$ is an OFDM symbol index within a time domain.

One RB is illustrated as including 7×12 REs, including 7 OFDM symbols in a time domain and 12 subcarriers in a frequency domain, but the number of OFDM symbols and the number of subcarriers within an RB are not limited thereto. The number of OFDM symbols and the number of subcarriers can be changed in various ways depending on the length of a CP, frequency spacing, etc. For example, in the case of a normal CP, the number of OFDM symbols can be 7 and in the case of an extended CP, the number of OFDM symbols can be 6. In one OFDM symbol, one of 128, 256, 512, 1024, 1536, and 2048 can be selected and used as the number of subcarriers. An uplink slot can also have the same structure as the downlink slot.

Figure 4:
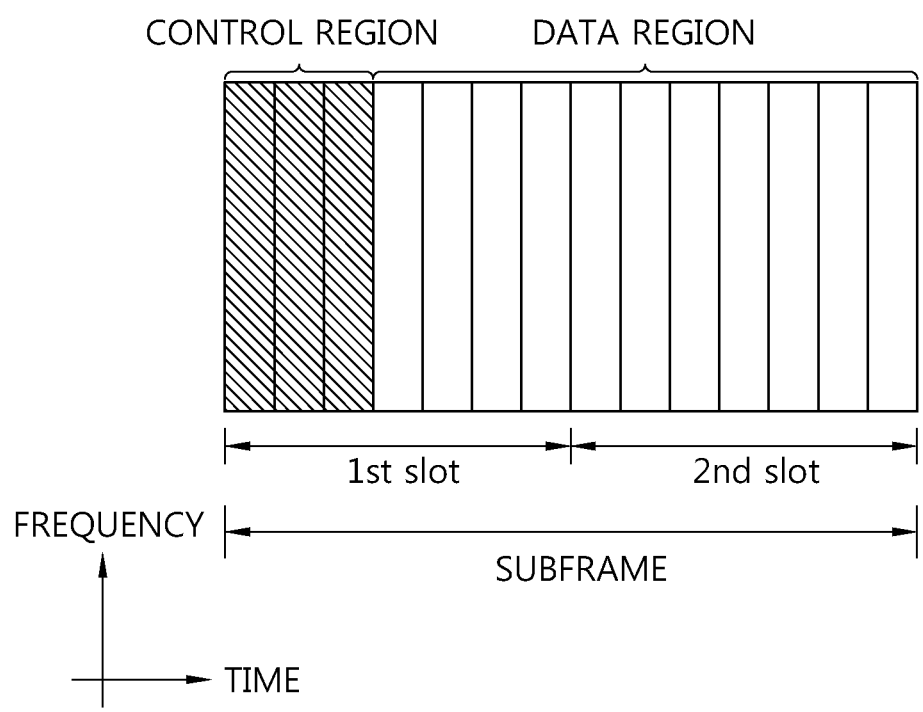
FIG. 4 shows the structure of a downlink subframe.

FIG. 4 shows the structure of a downlink subframe.

The downlink subframe includes two slots in a time domain, and each of the slots includes 7 OFDM symbols in a normal CP. A maximum of former 3 OFDM symbols (i.e., a maximum of 4 OFDM symbols for a 1.4 MHz bandwidth) in the first slot within the downlink subframe corresponds to a control region to which control channels are allocated, and the remaining OFDM symbols correspond to a data region to which Physical Downlink Shared Channels (PDSCHs) are allocated.

A physical downlink control channel (PDCCH) carries the resource allocation (this is also called a downlink grant) and transport format of a downlink-shared channel (DL-SCH) and the resource allocation information (this is also called an UL grant) of an Uplink Shared Channel (UL-SCH). Furthermore, the PDCCH can carry paging information on a paging channel (PCH), system information on a DL-SCH, the resource allocation of a higher layer control message, such as a random access response transmitted on a PDSCH, a set of Transmission Power Control (TPC) commands according to each terminal within a specific terminal group, the activation of a Voice over Internet Protocol (VoIP), etc. The control information transmitted through the PDCCH is called Downlink Control Information (DCI).

A PDSCH means a channel through which a BS sends data to a terminal. A BS can inform a terminal of resources, allocated to PDSCHs, through an RB group unit or the bitmap of an RB unit. Or, a BS may inform a terminal of resources allocated to PDSCHs according to a compact scheme. The compact scheme is a method of reducing information indicative of resources allocated to PDSCHs and sending the reduced information.

Figure 5:
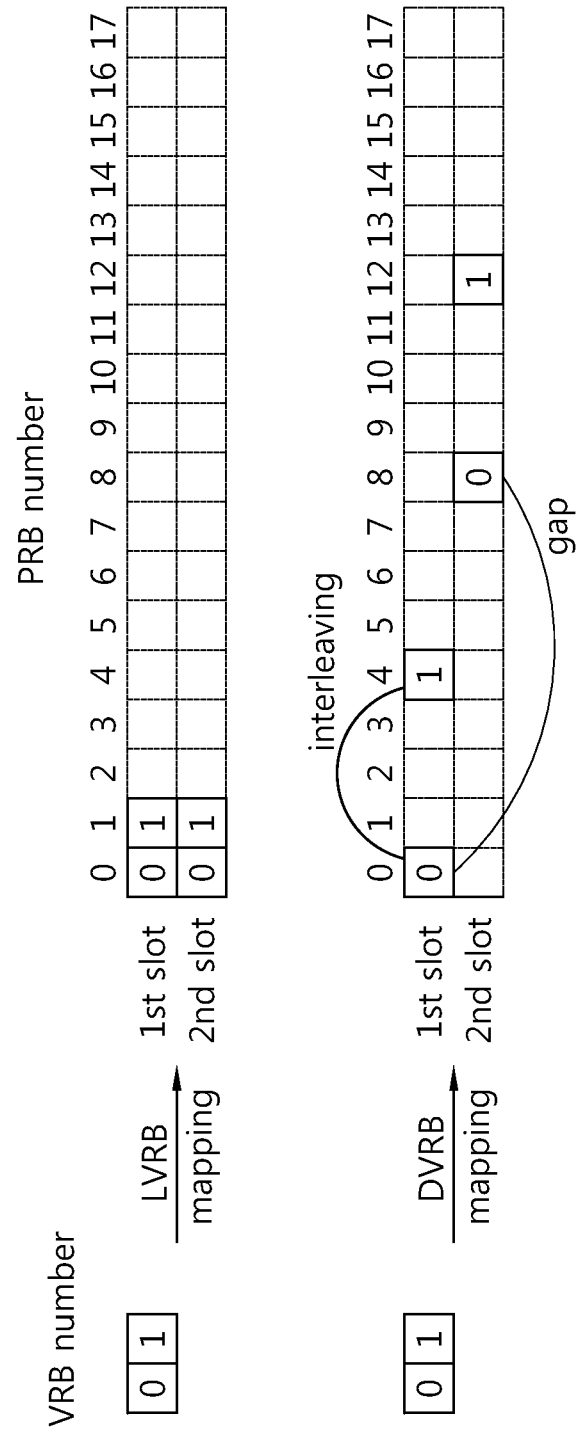
FIG. 5 shows an example of resource allocation according to a compact scheme in 3GPP LTE.

FIG. 5 shows an example of resource allocation according to a compact scheme in 3GPP LTE.

A BS can inform whether a localized resource allocation scheme will be used or not or a distributed resource allocation scheme will be used or not through an indicator included in a PDCCH. The localized resource allocation scheme is a method of informing resources allocated to PDSCHs through the index of the first Virtual RB (VRB) allocated to a PDSCH and the number of VRBs contiguous to the first VRB. In FIG. 5, an LVRB indicates this localized resource allocation scheme.

In the distributed resource allocation scheme, the VRBs of the same slot are interleaved and then allocated with the VRBs spaced apart from each other at a specific interval in a frequency domain. Furthermore, the VRBs of a first slot and a second slot are allocated with the VRBs spaced apart from each other by a gap value in a frequency domain. In FIG. 5, a DVRB indicates this distributed resource allocation scheme.

Figure 6:
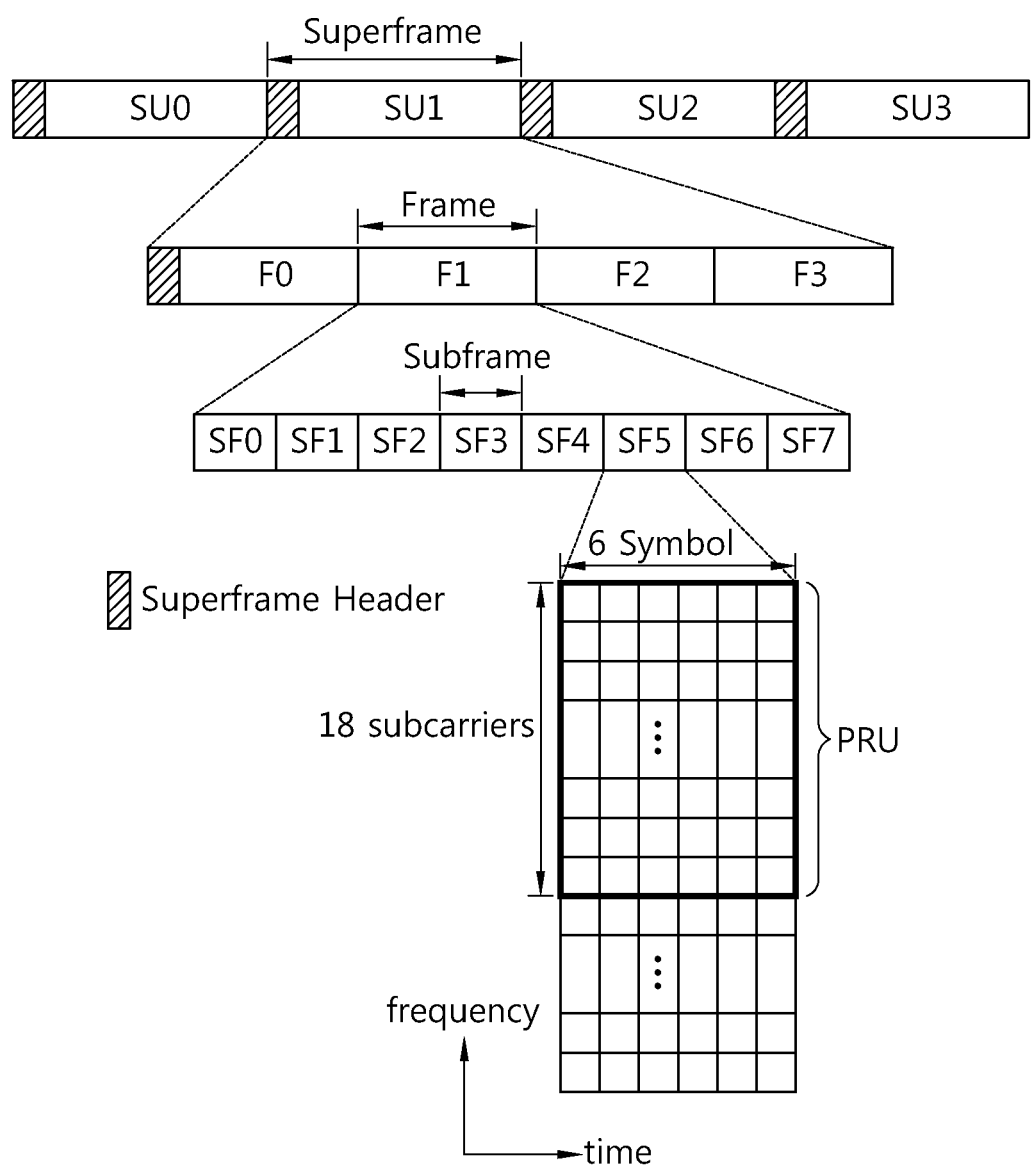
FIG. 6 shows an example of a superframe structure in IEEE 802.16m.

FIG. 6 shows an example of a superframe structure in IEEE 802.16m.

Referring to FIG. 6, a superframe (SF) includes a superframe header (SFH) and four frames F0, F1, F2, and F3. The frames within the superframe can have the same length. The size of each superframe is illustrated as being 20 ms and the size of each frame is illustrated as being 5 ms, but not limited thereto. The length of a superframe, the number of frames included in a superframe, the number of subframes included in a frame, etc. can be changed in various ways. The number of subframes included in a frame can be changed in various ways depending on a channel bandwidth and the length of a Cyclic Prefix (CP).

One frame includes a plurality of subframes SF0, SF1, SF2, SF3, SF4, SF5, SF6, and SF7. Each subframe can be used for uplink or downlink transmission. One subframe includes a plurality of OFDM symbols or OFDMA symbols in a time domain and includes a plurality of subcarriers in a frequency domain. A subframe can include 5, 6, 7, or 9 OFDMA symbols, but this is only an example. The number of OFDMA symbols included in a subframe is not limited. The number of OFDMA symbols included in a subframe can be changed in various ways depending on a channel bandwidth and the length of a CP. A subframe can include at least one Physical Resource Unit (PRU). One PRU can include 5 contiguous OFDMA symbols and 18 contiguous subcarriers, but is not limited thereto. The number of OFDMA symbols included in a PRU can be changed depending on the number of OFDM symbols that form a subframe.

An SFH can carry essential system parameters and system configuration information. An SFH can be located within the first subframe within a superframe. An SFH can occupy the last 5 OFDMA symbols of the first subframe. A superframe header can be divided into a primary-SFH (P-SFH) and a secondary-SFH (S-SFH). A P-SFH and an S-SFH can be transmitted every superframe. An S-SFH can be transmitted in two contiguous superframes. Information transmitted in an S-SFH can be classified into three subpackets of an S-SFH SP1, an S-SFH SP2, and an S-SFH SP3. Each subpacket can be transmitted periodically with a different cycle. Information transmitted through each of the S-SFH SP1, the S-SFH SP2, and the S-SFH SP3 can have a different importance. The S-SFH SP1 can be transmitted in the shortest cycle, and the S-SFH SP3 can be transmitted in the longest cycle. The S-SFH SP1 includes information about network re-entry. The S-SFH SP2 includes information about initial network entry and network discovery. The S-SFH SP3 includes the remaining important system information.

Figure 7:
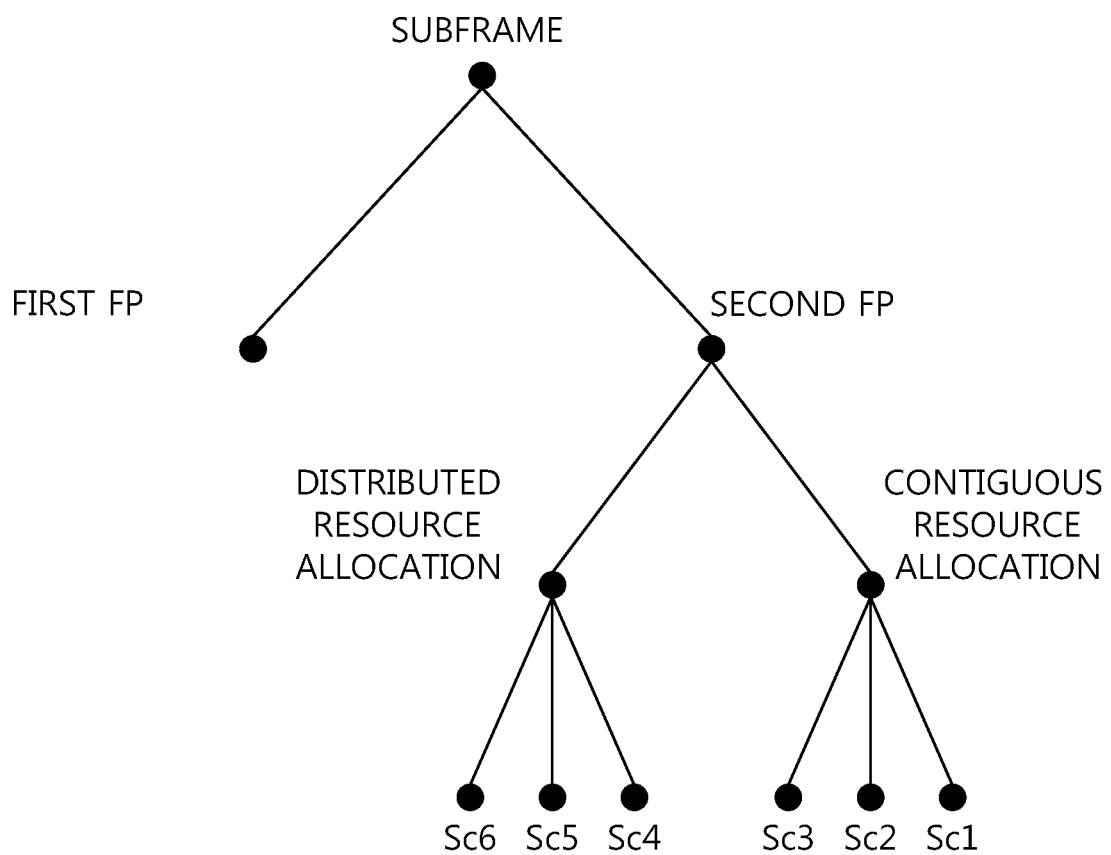
FIG. 7 shows an example of downlink resource allocation in IEEE 802.16m.

FIG. 7 shows an example of downlink resource allocation in IEEE 802.16m.

Each downlink subframe can be classified into 4 or less Frequency Partitions (FPs). FIG. 7 illustrates that a subframe is classified into two frequency partitions, but the number of frequency partitions within a subframe is not limited to two. Each frequency partition includes at least one PRU over all available OFDMA symbols within a subframe. Furthermore, each frequency partition can include contiguous/localized and/or distributed PRUs. Each frequency partition can be used for other purposes, such as Fractional Frequency Reuse (FFR). In FIG. 7, a second frequency partition includes both contiguous/localized resource allocation and distributed resource allocation. 'Sc' indicates a subcarrier.

A PRU is a basic physical unit for resource allocation, and the PRU includes $P_{sc}$ (a natural number) which represents a number of contiguous/localized subcarriers and $N_{sym}$ (a natural number) which represent a number of contiguous/localized OFDMA symbols. $P_{sc}$ can be 18. $N_{sym}$ can be the same as the number of OFDMA symbols included in one subframe. Accordingly, $N_{sym}$ can be determined by the type of subframe. For example, if one subframe includes 6 OFDMA symbols, a PRU can be defined by 18 subcarriers and 6 OFDMA symbols. A Logical Resource Unit (LRU) is a basic logical unit for distributed and contiguous resource allocation.

A Distributed Logical Resource Unit (DLRU) can be used to obtain a frequency diversity gain. A DLRU includes distributed subcarrier groups within one frequency partition. A minimum unit that forms a DLRU can be a tone pair, that is, a pair of a plurality of subcarriers. A downlink DLRU can be obtained by performing subcarrier permutation on the data subcarrier of a Distributed Resource Unit (DRU). The size of a DRU is the same as the size of a PRU. That is, the DRU can include Psc subcarriers and Nsym OFMDA symbols.

A Contiguous Logical Resource Unit (CLRU) can be used to obtain a frequency selective scheduling gain. A CLRU includes a group of contiguous/localized subcarriers within localized allocated resources. A CLRU includes data subcarriers within a Contiguous Resource Unit (CRU). The size of a CRU is the same as the size of a PRU. A CLRU can be obtained by directly mapping a CRU. A CLRU can be divided into a subband LRU based on a subband (SB) CRU (hereinafter referred as an SLRU) and a miniband (MB) LRU based on an MB CRU (hereinafter referred as an NLRU), depending on the type of CRU that is a basis.

Figure 8:
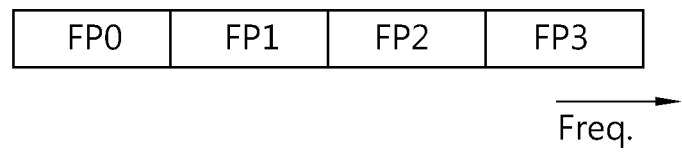
FIG. 8 shows an example of a method of partitioning the entire frequency band into a plurality of frequency partitions.

FIG. 8 shows an example of a method of partitioning the entire frequency band into a plurality of frequency partitions.

Referring to FIG. 8, the entire frequency band is partitioned into a first frequency partition FP0, a second frequency partition FP1, a third frequency partition FP2, and a fourth frequency partition FP3. Each frequency partition can be partitioned from the entire frequency band logically and/or physically.

Figure 9:
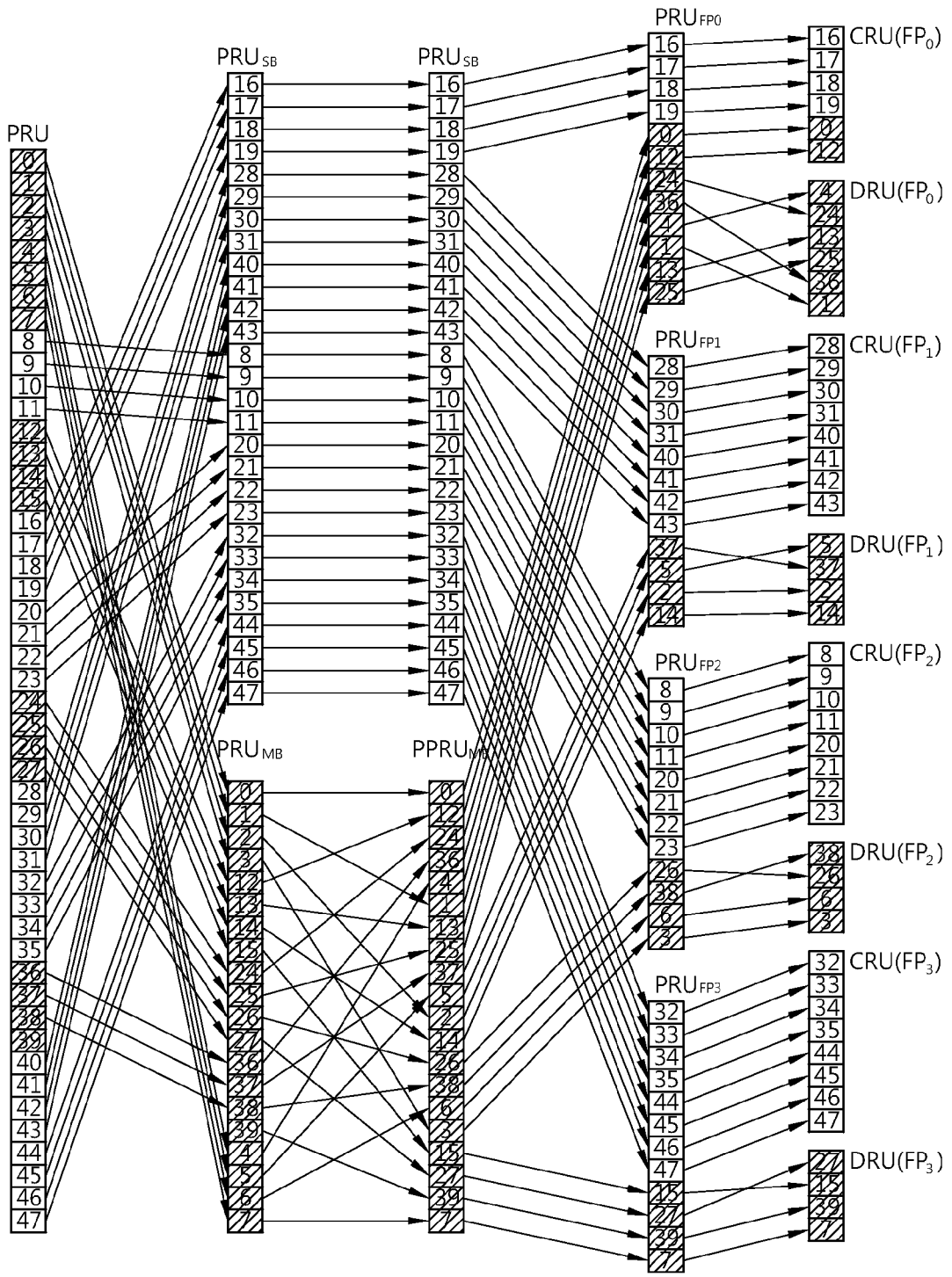
FIG. 9 shows an example of the allocation of frequency resources.

FIG. 9 shows an example of the allocation of frequency resources.

Frequency resources can be allocated through subband (SB) partitioning, miniband (MB) permutation, and frequency partitioning.

Referring to FIG. 9, a plurality of PRUs is allocated to an SB and an MB. An SB includes N1 contiguous PRUs, and an MB includes N2 contiguous PRUs. N1 may be 4 and N2 may be 1. An SB is suitable for frequency selective resource allocation because contiguous PRUs are allocated in a frequency domain. An MB is suitable for frequency distributive resource allocation and can be permutated in a frequency domain.

The number of SBs can be indicated by $K_{SB}$. The number of PRUs allocated to an SB can be indicated by $L_{SB}$, and $L_{SB}=N1*K_{SB}$. $K_{SB}$ can vary depending on a bandwidth. $K_{SB}$ can be determined by an Uplink Subband Allocation Count (USAC). The length of an USAC can be 3 bits to 5 bits and can be broadcasted through an SFH, etc. PRUs left over after being allocated to an SB are allocated to an MB. The number of MBs can be indicated by $K_{MB}$. The number of PRUs allocated to an MB can be indicated by $L_{MB}$, and $L_{MB}=N2*K_{MB}$. A total number of PRUs $N_{PRU}=L_{SB}+L_{MB}$.

A plurality of PRUs is divided into an SB and an MB and is rearranged within an SB PRU $PRU_{SB}$ and an MB PRU $PRU_{MB}$. PRUs within a $PRU_{SB}$ are indexed by respective $0\sim(L_{SB}-1)$, and PRUs within a $PRU_{MB}$ are indexed by respective $0\sim(L_{MB}-1)$. Furthermore, in an MB permutation process, a $PRU_{MB}$ is mapped to a permutation PRU $PPRU_{MB}$. In a frequency partitioning process, the PRUs of a $PRU_{SB}$ and a $PPRU_{MB}$ are allocated to at least one frequency partition.

A method of allocating resources in a multi-node system is described below.

Figure 10:
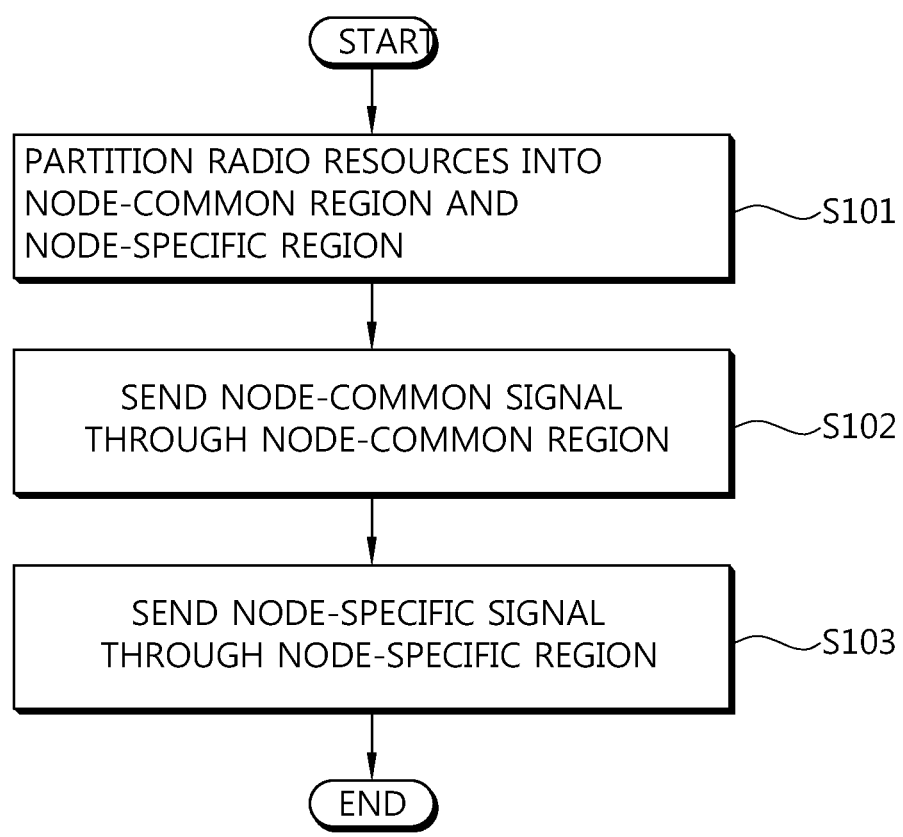
FIG. 10 shows a method of allocating resources in a multi-node system in accordance with an embodiment of the present invention.

FIG. 10 shows a method of allocating resources in a multi-node system in accordance with an embodiment of the present invention.

A BS partitions radio resources into a node-common region and a node-specific region (S101).

Here, the node-common region is a resource region in which all nodes within a cell controlled by the BS use the same frequency resource allocation scheme. In contrast, the node-specific region is a resource region in which nodes within a cell use different frequency resource allocation schemes.

Each node sends a node-common signal using the node-common region (S102). The node-common signal can include information equally applied to nodes. The node-common region can be used for a terminal operating in an existing CAS system (hereinafter referred as a CAS terminal) and/or a terminal operating in a multi-node system (hereinafter referred as a DAS terminal), such as a distributed antenna system.

Each node sends a node-specific signal that is specific to each node using the node-specific region (S103). The node-specific region can be used for a DAS terminal.

The above-described method of allocating resources can be applied to various wireless communication systems. For example, the above method can be applied to IEEE 802.16m, LTE-A, etc. First, a case where the present invention is applied to IEEE 802.16m is described below.

I. IEEE 802.16m

Figure 11:
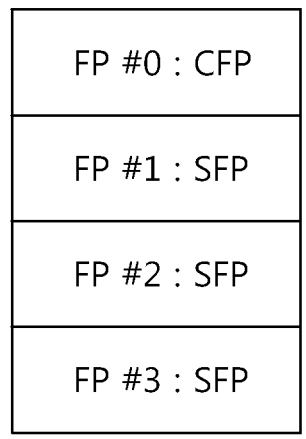
FIG. 11 shows an example of frequency partitions partitioned according to an applicable resource allocation scheme.

FIG. 11 shows an example of frequency partitions partitioned according to an applicable resource allocation scheme.

A ratio of Frequency Partitions (FPs) is equally maintained in each node. For example, each node can have 4 FPs, and the ratio of 4 FPs can be the same in each node. The BS enables the same resource allocation scheme to be used in all the nodes in some of the 4 FPs and different resource allocation schemes to be used in each node in the remaining FPs. Here, the resource allocation scheme can be, for example, a permutation method for PRUs.

An FP to which the same permutation is applied in all nodes can be called a Common Frequency Partition (CFP). That is, a CFP shows an example of a node-common region. FIG. 11 shows an example in which an FP #0 is used as a CFP.

The position of a CFP can be determined in various ways. For example, a CFP can be set as a region in which superframe header (SFH) information is transmitted. Part of or the entire SFH information can be transmitted in a CFP. For example, only cell-common parameter information within SFH information can be transmitted in a CFP. A cell-common parameter means a broadcast message that can be shared within a cell, and information, such as the number of superframes, the MAC ID of a BS, a frequency partition ratio, the number of subbands of a CFP, and the number of minibands of a CFP, can correspond to the cell-common parameter.

The cell-common parameter can be applied to both a CAS terminal and a DAS terminal within a cell. Accordingly, the CAS terminal can receive control information and data burst through the CFP.

An FP to which a different permutation is applied according to each node can be called a Specific Frequency Partition (SFP). That is, an SFP shows an example of a node-specific region. FIG. 11 shows a case where an FP #1, an FP #2, and an FP #3 are SFPs.

The number of PRUs allocated to each SFP is the same, but whether the PRUs will be allocated on the basis of a CRU based on how many subbands, a CRU based on how many mainibands, and a DRU can be differently set according to each node. That is, different PRU permutations can be applied to nodes. In this case, data allocated to the miniband-based CRU or the DRU can be prevented from being allocated to the same physical resources in neighboring nodes. Accordingly, there is an advantage in that interference can be avoided.

A node-specific signal can be transmitted in an SFP. A node-specific signal can be a signal having a different value in each node. A node-specific signal can include information about the permutation of the SFP of a corresponding node. For example, the node-specific signal can include information about the number of subbands and the number of minibands of an SFP, the number of antennas of each node, the position of a node-specific midamble, and sequence. A DAS terminal can receive control information and data burst transmitted in an SFP.

FIG. 12 shows an example in which permutation is applied to each FP in two nodes.

Referring to FIG. 12, each of a node #n and a node #m uses 4 FPs. Each of the node #n and the node #m uses a permutation 1 in an FP #0. The node #n sequentially uses a permutation 2, a permutation 3, and a permutation 4 in an FP #1, an FP #2, and an FP #3. In contrast, the node #m sequentially uses a permutation 3, a permutation 4, and a permutation 2 in an FP #1, an FP #2, and an FP #3. Accordingly, interference is reduced because each of the node #n and the node #m can send a node-specific signal using different physical resources.

The present invention can be applied to uplink in addition to downlink. If the present invention is applied to uplink, the transmission and reception of control information and data of a CAS terminal are performed using a CFP. The transmission and reception of control information and data of a DAS terminal are performed using an SFP. Uplink control channels, such as a ranging channel, a bandwidth request channel, a fast feedback channel, and an HARQ feedback channel, can use a CFP region or some SFP regions according to each purpose. Or, an uplink control channel for a CAS terminal can be allocated to a CFP, and an uplink control channel for a DAS terminal can be allocated to an SFP. Or, in a DAS terminal, a ranging channel and a bandwidth request channel can be allocated to a CFP, and the remaining can be allocated to SFPs.

II. LTE/LTE-A System

Since the position of a PDCCH is fixed in LTE/LTE-A, the PDCCH can be allocated to send information common to nodes within a cell. A PDCCH has high backward compatibility when it maintains an existing format. Accordingly, a node-specific signal can be allocated to a PDSCH. Here, to send a node-specific signal means that a different signal can be transmitted by each node although the nodes are included in the same cell. Accordingly, a node-specific signal may be used to send common information within a node to terminals within the node, send common information within a node to each of terminals within the node, or send different information according to each terminal within a node to each terminal.

If a localized resource allocation scheme (LVRB) is used to send a node-specific signal, resource allocations may not overlaid with each other between nodes through scheduling. If a distributed resource allocation scheme (DVRB) is used to send a node-specific signal, a different interleaver or gap value can be used according to each node. If a different distributed resource allocation scheme is used in each node as described above, resources allocated by a DVRB can be used for only the transmission of node-specific information. A CAS terminal cannot use a DVRB for control information for the CAS terminal and the transmission and reception of data burst because it does not know the configuration of the DVRB.

PDSCHs configured according to a DVRB or the LVRB can be used for control information for a DAS terminal and the transmission and reception of data burst. Node-specific information, such as an interleaver or gap value, can be transmitted to a DAS terminal to which resources have been allocated according to a DVRB in a predetermined PDSCH region not a PDCCH. A resource region in which this node-specific information is transmitted is called an E-PDCCH. The position of an E-PDCCH should be previously fixed or signaled to a terminal.

Figure 13:
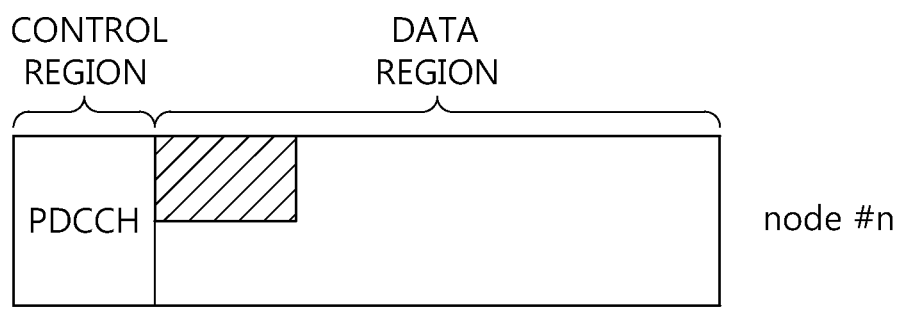
FIG. 13 shows an example of E-PDCCH allocation.
Figure 13:
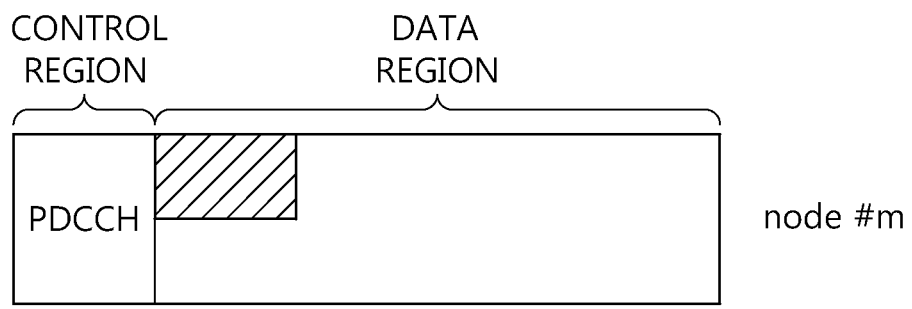
Figure 13:
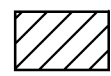

FIG. 13 shows an example of E-PDCCH allocation.

Referring to FIG. 13, an E-PDCCH is allocated within a data region in which a PDSCH is transmitted. For example, if a PDCCH is allocated to some OFDM symbols within the first slot, an E-PDCCH can be allocated to the remaining OFDM symbols of the first slot. Or, an E-PDCCH can be allocated to the second slot or the remaining OFDM symbols of the two slots from which OFDM symbols to which a PDCCH has been allocated have been subtracted. If the position of an E-PDCCH is not fixed, a BS can inform a terminal of the position of the E-PDCCH through a higher layer signal, such as RRC. The position of an E-PDCCH can be equally determined for all nodes as in FIG. 13 or can be determined differently according to each node.

Figure 14:
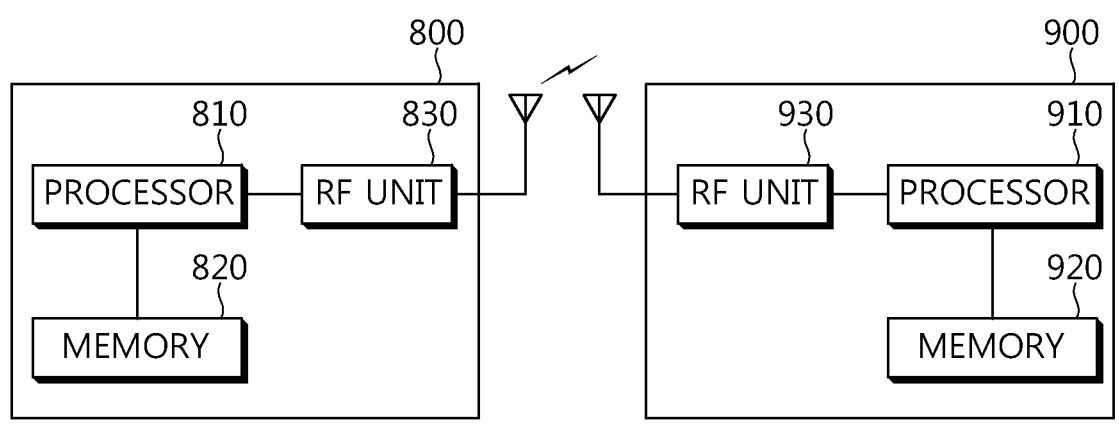
FIG. 14 is a block diagram of an eNB and a terminal in which the embodiments of the present invention are implemented.

FIG. 14 is a block diagram of a BS and a terminal in which the embodiments of the present invention are implemented.

The BS 800 includes a processor 810, a memory 820, and a Radio Frequency (RF) unit 830. The BS 800 can control a plurality of nodes in a multi-node system. The processor 810 implements the proposed functions, processes and/or methods. The layers of a radio interface protocol can be implemented by the processor 810. The processor 810 partitions radio resources into a node-common region and a node-specific region and allocates the node-common region and the node-specific region to a plurality of nodes that control the node-common region and the node-specific region. Here, a common resource allocation scheme is applied to the plurality of nodes in the node-common region, and different resource allocation schemes are applied to the plurality of nodes in the node-specific region. The memory 820 is coupled with the processor 810, and the memory stores various pieces of information for driving the processor 810. The RF unit 830 is coupled with the processor 810, and the RF unit sends and/or receives radio signals.

The terminal 900 includes a processor 910, a memory 920, and an RF unit 930. The RF unit 930 is coupled with the processor 910, and the RF unit sends and/or receives radio signals. The processor 910 implements the proposed functions, processes and/or methods. That is, the processor 910 can receive a node-common signal, such as system information, through a node-common region and can receive node-specific data through a node-specific region. The layers of a radio interface protocol can be implemented by the processor 910. The memory 920 is coupled with the processor 910, and the memory stores various pieces of information for driving the processor 910.

The processor 810, 910 can include Application-Specific Integrated Circuits (ASICs), other chipsets, logic circuits and/or data processors. The memory 820, 920 can include Read-Only Memory (ROM), Random Access Memory (RAM), flash memory, memory cards, storage media and/or other storage devices. The RF unit 820, 930 can include a baseband circuit for processing radio signals. When the above-described embodiment is implemented in software, the above-described scheme can be implemented into a module (process or function) that performs the above function. The module can be stored in the memory 820, 920 and executed by the processor 810, 910. The memory 820, 920 can be placed inside or outside the processor 810, 910 and can be coupled with the processor 810, 910 using a variety of well-known means. In the above exemplary system, although the methods have been described based on the flowcharts in the form of a series of steps or blocks, the present invention is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of the present invention.

The above embodiments include various aspects of examples. Although all possible combinations for representing the various aspects may not be described, those skilled in the art will appreciate that other combinations are possible. Accordingly, the present invention should be construed as including all other replacements, modifications, and changes which fall within the scope of the claims.

The invention claimed is:

1. A method of allocating resources in a multi-node system comprising a plurality of nodes and a base station connected to the plurality of nodes and capable of controlling the plurality of nodes, the method comprising:
    partitioning radio resources into a node-common region and a node-specific region in a frequency domain, and allocating the node-common region and the node-specific region to the plurality of nodes,
    wherein, in the node-common region, a common resource allocation scheme is applied to the plurality of nodes, and, in the node-specific region, different resource allocation schemes are applied to the plurality of nodes,
    wherein the plurality of nodes transmit, through the node-common region, control information and data for a first user equipment (UE) which is operated in a centralized antenna system,
    wherein the plurality of nodes transmit, through the node-specific region, control information and data for a second UE which is operated in a distributed antenna system,
    wherein the radio resources are divided into a control region to which a control channel is allocated and a data region to which a data channel is allocated in a time domain,
    wherein the node-common region is included in the control region, and the node-specific region is included in the data region, and
    wherein a start location of the node-specific region is indicated through a higher layer signal.

2. The method of claim 1, wherein:
    a node-common signal common to the plurality of nodes is transmitted in the node-common region, and
    a node-specific signal specific to each of the plurality of nodes is transmitted in the node-specific region.

3. The method of claim 1, wherein:
    the radio resources comprise a plurality of frequency partitions in a frequency domain, and
    some frequency partitions of the plurality of frequency partitions are allocated to the node-common region and remaining frequency partitions are allocated to the node-specific region.

4. The method of claim 3, wherein a number of the plurality of frequency partitions is 4.

5. The method of claim 3, wherein a ratio of frequency partitions allocated to the node-common region to frequency partitions allocated to the node-specific region, from among the plurality of frequency partitions, is identical in all the plurality of nodes.

6. The method of claim 3, wherein, in the frequency partitions allocated to the node-common region, an identical resource unit permutation is applied to the plurality of nodes.

7. The method of claim 6, wherein, in the frequency partitions allocated to the node-specific region, different resource unit permutations are applied to the plurality of nodes in the frequency partitions allocated to the node-specific region.

8. An apparatus for allocating resources in a multi-node system connected to a plurality of nodes and capable of controlling the plurality of nodes, the apparatus comprising:
    a Radio Frequency (RF) unit transmitting and receiving radio signals; and
    a processor coupled with the RF unit and generating a radio signal,
    wherein the processor partitions radio resources into a node-common region and a node-specific region in a frequency domain, allocates the node-common region and the node-specific region to the plurality of nodes, applies, in the node-common region, a common resource allocation scheme to the plurality of nodes, and applies, in the node-specific region, different resource allocation schemes to the plurality of nodes,
    wherein the plurality of nodes transmit, through the node-common region, control information and data for a first user equipment (UE) which is operated in a centralized antenna system,
    wherein the plurality of nodes transmit, through the node-specific region, control information and data for a second UE which is operated in a distributed antenna system, wherein the radio resources are divided into a control region to which a control channel is allocated and a data region to which a data channel is allocated in a time domain, wherein the node-common region is included in the control region, and the node-specific region is included in the data region, and wherein a start location of the node-specific region is indicated through a higher layer signal.

* * * * *